Patented Dec. 7, 1926.

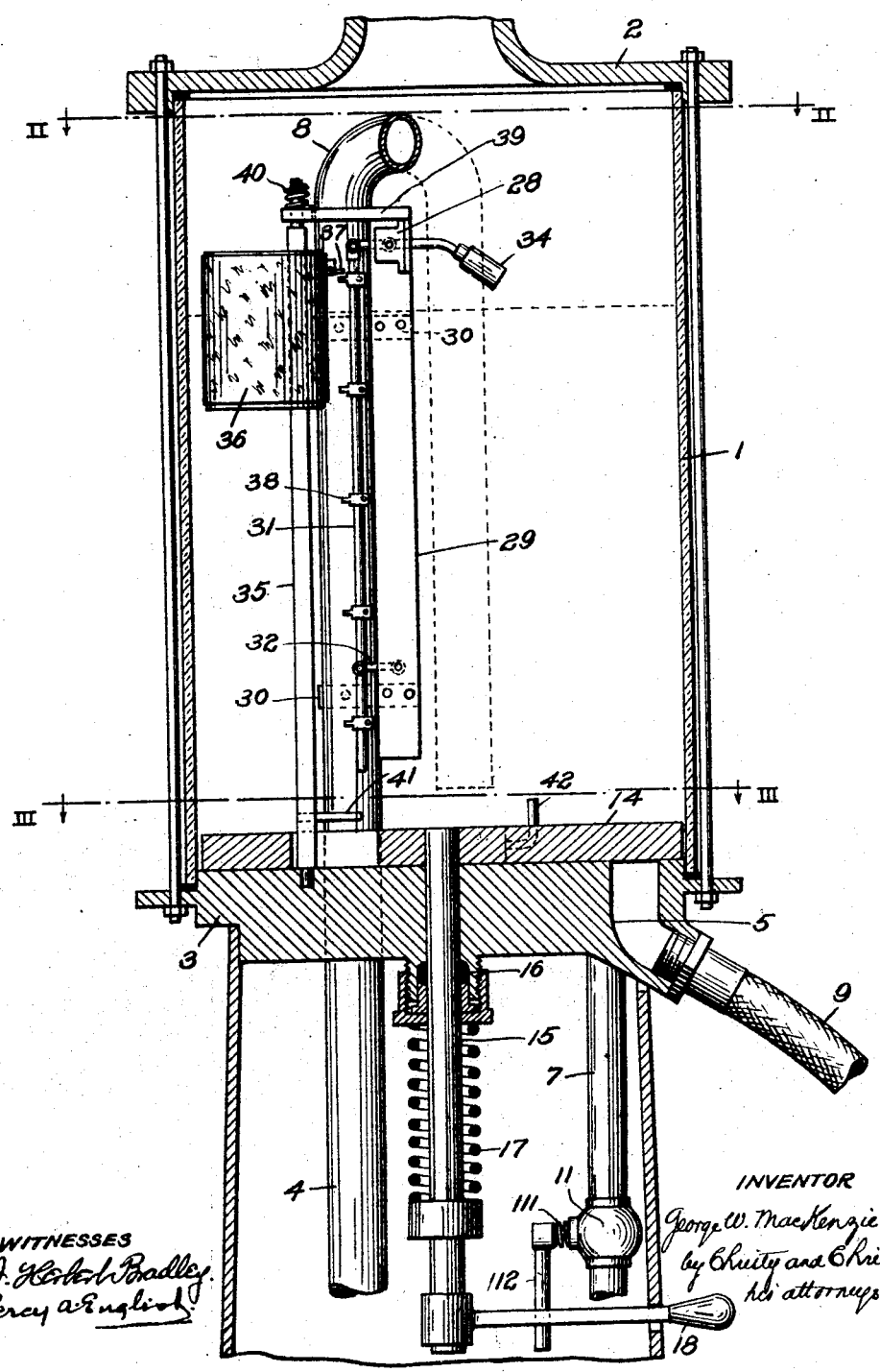

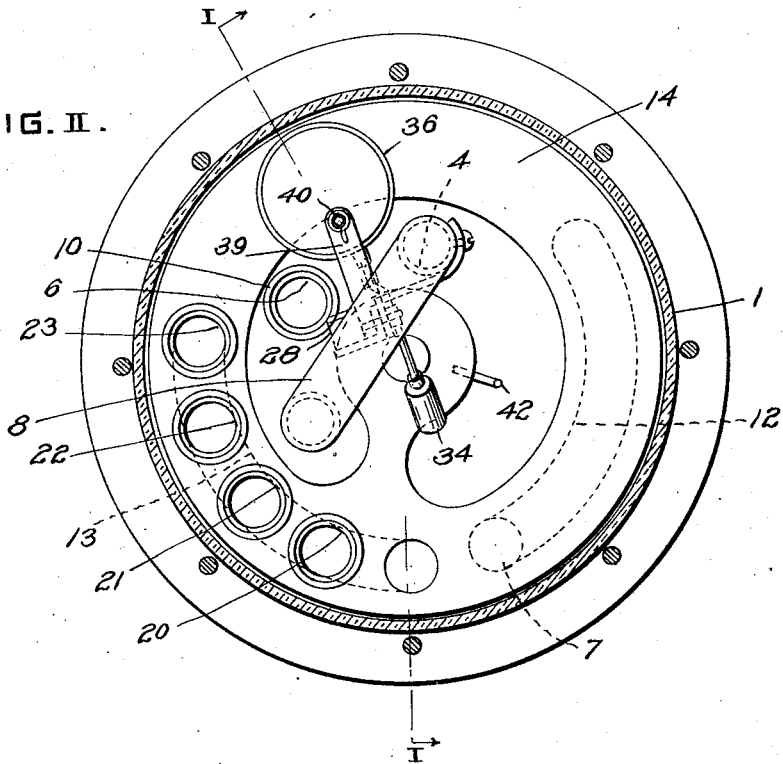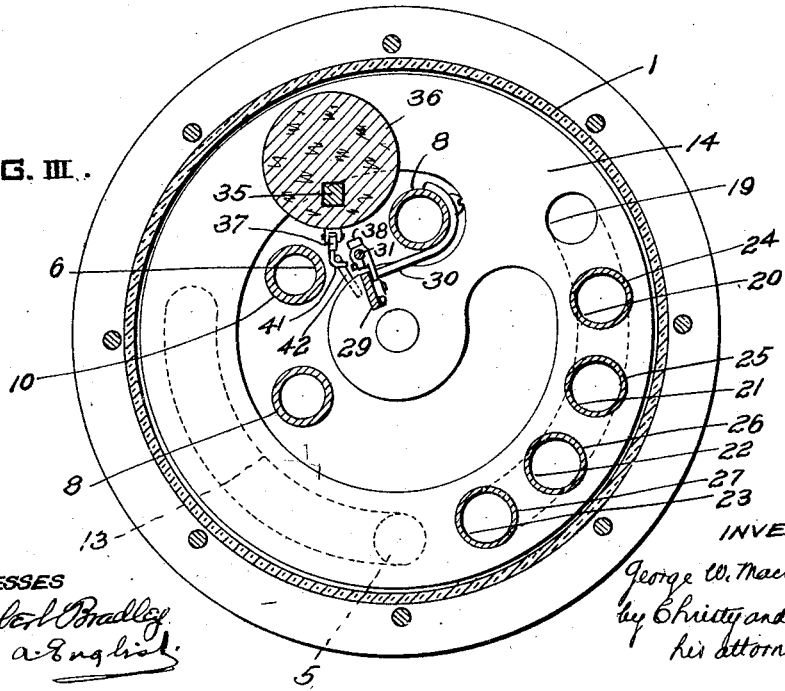

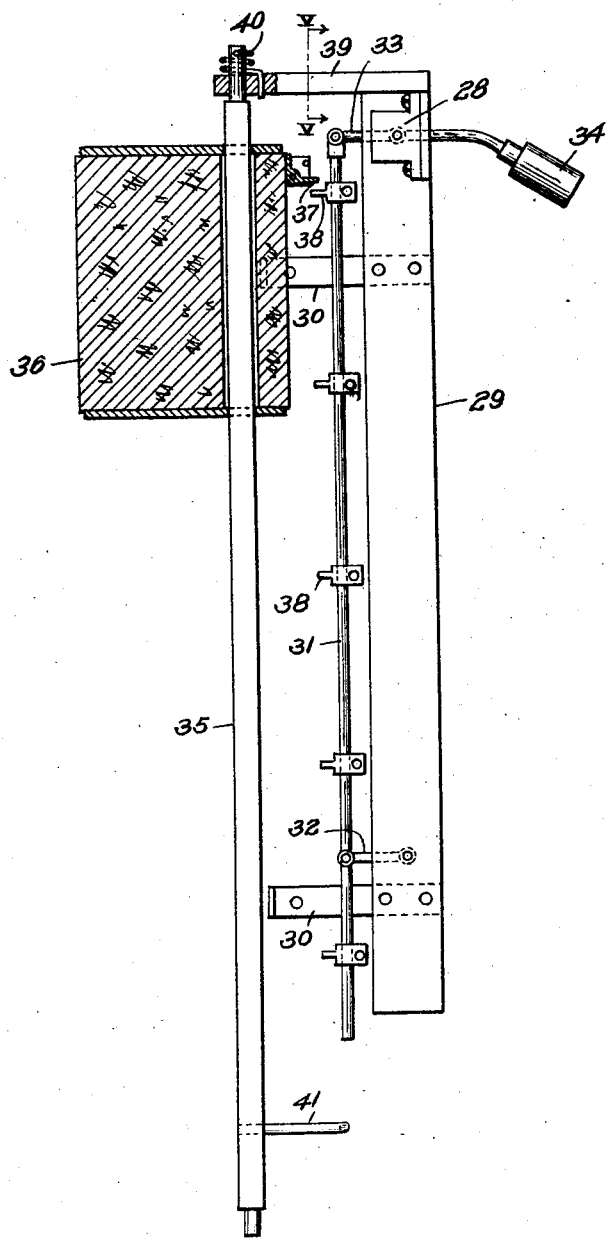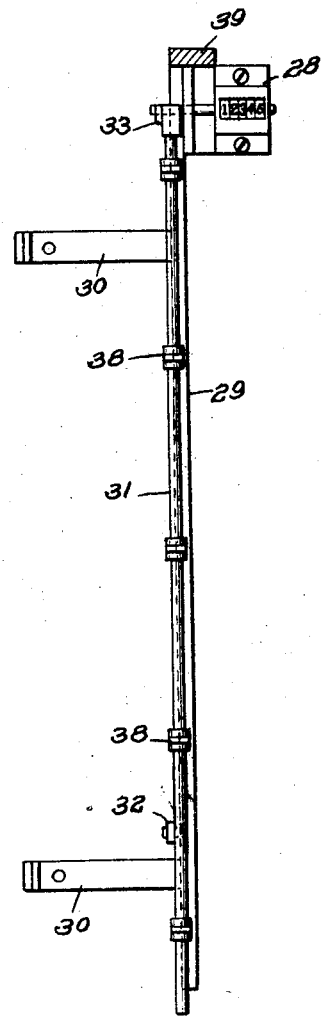

1,610,102

UNITED STATES PATENT OFFICE.

GEORGE W. MacKENZIE, OF BEAVER, PENNSYLVANIA, ASSIGNOR TO JOHN R. FOSTER, OF ROCHESTER, PENNSYLVANIA.

LIQUID-MEASURING APPARATUS.

Application filed July 29, 1925. Serial No. 46,736.

My invention relates to liquid-measuring apparatus, and finds practical application as an adjunct to liquid-dispensing apparatus, and particularly to gasoline-dispensing apparatus. In such application I shall show and describe it.

In the accompanying drawings Fig. I is a view in vertical section of the measuring chamber of a now familiar form of gasoline-dispensing apparatus, to which my present invention is here applied. Fig. II is a view in horizontal section, on a plane adjacent the upper head of the cylindrical measuring chamber of Fig. I, looking downward, and showing the contained parts in plan from above. Fig. III is a view similar to Fig. II, but on a plane adjacent the lower head of the measuring chamber. In Fig. III, also, the vertically moving float, which in Fig. I appears near the upper end of its range, is shown, and it will be understood to be in lowered position. Fig. I is taken on two radial planes, indicated by the broken line I—I, Fig. II. Fig. IV is a view to somewhat larger scale, showing registering apparatus. This in the main is a view in side elevation; details, however, are shown in section. Fig. V is a view of the same apparatus, seen in front elevation, but with the float and its carrier removed, as though cut away on the plane indicated at V—V, Fig. IV.

Referring, first, to Figs. I, II, and III. The measuring chamber will be seen to be of familiar form, in that it consists of an otherwise open-ended cylindrical body 1, ordinarily of glass, sustained in vertical position and bolted between upper and lower plates 2 and 3, ordinarily of cast iron. These plates form the heads of the cylindrical chamber. Through the lower plate extend an inlet lead 4, a delivery lead 5, an overflow lead 6, and a return lead 7. The inlet lead carries gasoline from a suitable source of supply, an underground tank, for example, and while any preferred mode of filling may be employed, ordinarily gasoline is drawn by suction from the source of supply through the inlet lead 4 and into the measuring chamber, which from this point forward will be designated merely by the reference numeral 1. It is usual that a check valve be included in the line of flow from the source of supply through the inlet lead to the measuring chamber, and, while no valve appears in the drawings, it will be understood that such a valve is present in the installation, and that back-flow through inlet lead 4 is prevented. Within the measuring chamber 1 the inlet lead is prolonged in an inverted U-shaped pipe 8, which rises from the bottom plate 3, approximately to the top of the chamber and, descending thence, opens downwardly near the bottom of the chamber. By such provision, quiet rise of the tide of gasoline within measuring chamber 1 is assured. In Fig. I the descending branch of the U-shaped inlet pipe 8 is diagrammatically indicated in dotted lines. The delivery lead 5 is continued, as appears in Fig. I, in the usual delivery hose 9. The overflow lead is prolonged in a stand pipe 10 which rises from plate 3 to the upper part of the measuring chamber. It is open above, and it is in free communication with the supply tank below. Its presence insures the filling of the measuring chamber to a predetermined point and the retention in the measuring chamber of a predetermined maximum volume of gasoline. The return lead carries gasoline by gravity, back to the supply tank. It will be understood that at a convenient point in this return lead a hand-operated cut-off valve is arranged. Such a valve is indicated diagrammatically at 11. The delivery lead 5 and the return lead 7 are relatively situated, as best shown in Fig. II, (of Fig. III) at equal radial distances from the axis of the cylinder. They are conveniently arranged adjacent one another, are of equal size, and are separated at a small but sufficient interval. The plate 3 is provided with a groove 12 formed in its upper surface, continuous with the orifice to the return lead 7 and extending on the side of orifice 7 opposite to the orifice 5, and in the arc of a circle, of which the axis of the cylinder is the center. Similarly, the orifice to delivery lead 5 is continued in a groove 13 formed in the upper surface of plate 3. This groove is similarly curved and symmetrical in its arrangement, opposite to groove 12, as will appear in considering Figs. II and III. The inlet lead 4 and the overflow lead 6 are arranged adjacent one another, at equal radial distances from the cylindrical axis, but at less distance from the axis than leads 5 and 7; and, with respect to the cylindrical axis, they are arranged opposite leads 5 and 7. This clearly appears in Fig. II.

A valve plate 14 is mounted within the cylindrical measuring chamber, and it is rotatable on the cylindrical axis as a center of turning. To this end it is mounted on a central stem 15. The stem extends through a central orifice in plate 3; its passage is sealed by a packing gland 16. The valve plate 14 is held to tight engagement upon the upper face of plate 3 by the tension of a spring 17 which engages a collar on stem 15. A handle 18 is provided, for rotating the valve plate. Fig. I shows handle 18 protruding through an opening in the outer wall of the fixture. It will be understood that the range of swing of handle 18 to effect the ends presently to be described may be defined and limited in usual manner. The valve plate is provided with a succession of orifices, 19, 20, 21, 22, and 23. One of them, 19, opens through the plate at the lever of its upper surface; the others, 20—23, are extended upwardly by stand pipes, 24, 25, 26, 27, which rise from the plate to successively higher points. These stand pipes at their upper ends are open.

Fig. III shows the valve plate 14 in non-delivering position. When it is in this position, valve 11 in the return pipe 7 being closed, the measuring chamber may be filled. Or, the measuring chamber being already full, and the valve plate 14 being in the position shown in Fig. III, opening of valve 11 will permit all the contents of the measuring chamber to drain by gravity into the supply tank. But the position shown in Fig. III is also the position preparatory to delivery. Let it be understood that the measuring chamber is full, to the limit determined by the height of the stand pipe 10. Then, valve 11 continuing closed, plate 14 may through handle 18 be rotated clockwise, as seen in Fig. III, to bring any one of orifices 23, 22, 21, 20, and 19 to register with delivery orifice 5 in plate 3. Then when the valve in the delivery end of hose 9 is opened, the apparatus will deliver so much of the gasoline contained in chamber 3 as lies between the maximum level, determined by the height of stand-pipe 10 and the effective level of the particular orifice which registers with orifice 5. The stand pipes 27, 26, 25, and 24 are graded in height. For example, the height of stand-pipe 10 may be such as to segregate within the measuring chamber five gallons of gasoline, and the stand-pipes 27, 26, 25, and 24 may be so graded in height that they will deliver, respectively, one, two, three, and four gallons, while orifice 19, which lacks a stand-pipe, and which opens at the level of the upper surface of valve plate 14, will, if it be brought to registry with orifice 5, effect the delivery of the whole five gallons.

In Fig. I an automatic operation is suggested, for the return to the supply tank of gasoline remaining in the measuring chamber, when service is done. The valve 11 is shown to be provided with a spring 111, tending to hold it normally closed, and the operating handle 112 of this valve is shown to extend across the path of swing of operating lever 18. By such an arrangement a further swing of lever 18, not at other times resorted to, will effect the opening of valve 11. It will be understood, of course, that this automatic provision need not prevent an independent swinging of valve handle 112, when desired.

It is to be remarked that, by virtue of the prolongation of orifices 7 and 5 in grooves 12 and 13 the plural pipes cooperate to accelerate the discharge of gasoline, either through the return lead to the supply tank or through the delivery lead to the consumer.

When delivery has been made, either of a fraction or of the whole of the full charge (five gallons) in the measuring chamber, valve plate 14 may be rotated counter-clockwise and brought back to the initial position, shown in Fig. III. Then, if there be gasoline remaining in the measuring chamber, it may, by the opening of valve 11, be returned to the supply tank; and whether the chamber be partly full or empty, it may be refilled to the maximum, ready for further deliveries.

Comparison of Figs. II and III will show valve plate 14 cut away, to permit the passage of inlet pipe 8 and stand pipe 10, and the cut is of such extent and shape that the rotation of the plate valve 14 in the manner described is not obstructed by the presence of pipes 8 and 10.

It is desirable to provide such apparatus with a counter to register the total amount of deliveries to customers in the course of continued service, and my invention resides in counter operating means, effective when delivery is being made through delivery orifice 5, but not otherwise. The means of my invention come automatically into play and go automatically out of play, accordingly as the apparatus is made ready for delivery or shifted from delivery position: to speak specifically, the means of my invention are automatically responsive to the shifting of valve plate 14.

At a convenient place, preferably within the measuring chamber 1, a counter 28 is rigidly mounted. The drawings show a satisfactory arrangement. A bar 29 borne on arms 30 which extend from the ascending arm of inlet pipe 8, itself extends vertically, near the center of measuring chamber 1.

This bar 29 at its upper end, and beyond the reach of the tide of gasoline, carries the counter 28. To bar 29 a rod 31 is mounted for vertical reciprocation adjacent bar 29. Such mounting is effected by links 32 and 33. The link 33 becomes a crank arm on the operating shaft of the tally 28, and this links is counterweighted, as indicated at 34. It will be observed that the alternate longitudinal downward and upward shifting of rod 31 will effect the operation of the counter.

Within the measuring chamber, and adjacent bar 29, but with rod 31 between, stands a vertically extending stem 35, and upon stem 35 a float 36 slides freely. The arrangement is such, however, that the float 36 is restrained from rotation upon the stem. To this end the stem is conveniently square in cross-section, and the opening in the float, through which the stem is threaded, is correspondingly shaped. Thus with the rise and fall of the tide of gasoline within the measuring chamber, the float 36 will ascend and descend. This appears most clearly in considering Fig. I. The float carries a swinging, outward-extending latch, rigid to resist strains which bear upon it from below, but yielding understrain from above. A convenient specific arrangement is that best shown in Fig. IV. A small metal angle 37 is so pivotally mounted upon float 36 that it stands normally with one arm projecting horizontally and the other extending vertically upon the vertical face of the float. The angle is free to turn, allowing the horizontally extending arm to swing downward; but opposite turning is opposed by abutment of the vertical arm upon the body of the float.

Cooperating with the latch 37 a series of steps 38 is borne by rod 31. These steps are so placed that when under the unhindered effect of gravity upon weight 34, rod 31 stands in the position shown in Fig. IV, steps 38 extend into the pathway of latch 37 when borne by float 36 it descends. The mounting of rod 31 by links upon bar 29, already described, brings it about that as through one or another of steps 38 the rod 31 is carried downward, it swings to the right also (Fig. IV) and in a direction away from the path of descent of latch 37. The descending latch engages one by one the steps 38 and engaging a step, effects a downward shift of rod 31, but presently the lateral shift of the rod carries the engaged step free of contact with latch 37. Thereupon, in response to gravity, the counterweighted rod 31 rises again to initial position.

Each such reciprocation of rod 31 effects a corresponding reciprocating rotation of the shaft of the counter, and a consequent unit shift of its legend-bearing elements.

As the latch 37 borne by float 36 passes in its descent each succeeding step 38, the same movement of parts ensues, and the same movement within the counter is effected. The steps 38 are so set that with the withdrawal of each gallon (or other unit) of gasoline from measuring chamber 1, the descending float 36 causes latch 37 to operate the described instrumentalities and advance the counter reading by one unit. As the float rises again the latch 37 swings when engaged from above by the steps 38, one after another, and there is no shifting of rod 31 nor any movement imparted to the counter.

I have explained that the measuring chamber being full, one or more gallons may be delivered to a customer, and any remaining gallons may be returned to the supply tank. It is desirable that the counter carry registration of so many gallons as have been sold, but shall make no registration of the gallons returned to the supply tank. This desirable discrimination is automatically accomplished as follows.

The stem 35, upon which the float 36 rises and falls is rotatable in its mounting, and its upper and lower bearings are conveniently formed in an arm 39 which extends laterally from bar 29, and in the plate 3. This is clearly shown in Figs. I and IV. A spring 40 tending always to turn the stem 35 in counter-clockwise direction (Fig. III) holds the stem 35 normally in the position shown in Fig. II, and in that position the interengagement of latch 37 with steps 38 is such as has been described. Stem 35 is further provided with an arm 41, and valve plate 14 is provided with a pin 42, and these are so relatively placed that as valve plate 14 is turned to the position shown in Fig. III, a position in which delivery to a customer is impossible, but a position preparatory to the return of gasoline from the measuring chamber to the supply tank, pin 42 engaging arm 41 effects a turning of stem 35, against spring tension, clockwise as seen in Figs. II and III, and float 36 with it, to the particular position shown in Fig. III. In that position the latch 37 is no longer aligned vertically with the steps 38.

With the parts in the position shown in Fig. III, valve 11 being closed, the measuring chamber may be filled. The counter operating apparatus is then in non-operating position, for latch 37 is not aligned vertically with steps 38. The measuring chamber having been filled valve plate 14 may be rotated to delivery position and delivery may be made. With the rotation of the valve plate 14 (clockwise, Fig. III) pin 42 recedes and stem 35 together with float 36 under the influence of spring 40 resume normal position, with the latch 37 in vertical alignment with steps 38. In the sequent delivery of gasoline to the purchaser, the counter will by the means described, be operated. But when gasoline previously drawn into the measuring chamber is to be returned to the supply tank (and of this registration is not desired) valve plate 14 must first be shifted counter-clockwise to the position shown in Fig. III. In that shifting the stem 35 and the float 36 are automatically turned again, and latch 37 is carried aside, out of vertical alignment with the steps. And then in the further descent of the float, incident to the return of gasoline to the supply tank, there will be no functioning of the counter.

It will be perceived that by providing latches 37 such as described, and which yield under strain from above, it is possible to fill the measuring chamber, regardless of the particular position in which the rotary stem 35 may happen to be.

I claim as my invention:

1. In liquid-measuring apparatus, the combination with a tank having a delivery-controlling valve and with a float-operated counter, of a float arranged within and movable both vertically and transversely within the tank and adapted within its range of vertical movement to operate said counter and within its range of transverse movement to come to and from counter-operating position, the said float being responsive in such transverse movement to movement of said delivery-controlling valve.

2. In liquid-measuring apparatus, the combination with a tank having a delivery-controlling valve and with a float-operated counter including a rotary shaft equipped with a crank arm, of a stepped operating rod hung from such crank arm, and a float arranged within and movable both vertically and transversely within said tank and provided with a step-engaging projection, the float being responsive in its transverse movement to the movement of said delivery-controlling valve.

3. In liquid-measuring apparatus, the combination with a vertically standing cylindrical tank having a delivery orifice in its bottom wall and a ported plate rotary upon such bottom wall and by rotation controlling egress through said delivery orifice, and with a float-operated counter, of a stem arranged vertically within said tank and rotatably borne by the bottom wall of said tank, and a counter-operating float vertically movable upon said stem and rotatable in unison with said stem to and from counter-operating position, said stem being rotatable in response to rotation of said plate.

4. In liquid-measuring apparatus, the combination with a tank having a delivery-controlling valve and with a float-operated counter, of a stem arranged vertically within and rotatable in its position within said tank, a counter-operating float vertically movable upon said stem and rotatable in unison with said stem to and from counter-operating position, and means tending to hold said stem with the float in counter-operating position, said stem being rotatable against the tension of the means last named and in response to movement of said delivery-controlling valve.

5. In liquid-measuring apparatus, the combination with a tank and a counter, of a stem arranged vertically within and rotatable in its position within said tank, a counter-operating float vertically movable upon said stem and rotatable in unison with said stem to and from counter-operating position, and means for rotating said stem.

In testimony whereof I have hereunto set my hand.

GEORGE W. MACKENZIE.